US008867028B2

(12) United States Patent
Yablon et al.

(10) Patent No.: US 8,867,028 B2
(45) Date of Patent: Oct. 21, 2014

(54) SYSTEM AND/OR METHOD FOR MEASURING WAVEGUIDE MODES

(71) Applicant: Interfiber Analysis, LLC, Livingston, NJ (US)

(72) Inventors: Andrew D. Yablon, Livingston, NJ (US); Jayesh Jasapara, Watchung, NJ (US)

(73) Assignee: Interfiber Analysis, LLC, Sharon, MA (US)

( * ) Notice: Subject to any disclaimer, the term of this patent is extended or adjusted under 35 U.S.C. 154(b) by 0 days.

(21) Appl. No.: 13/656,582

(22) Filed: Oct. 19, 2012

(65) Prior Publication Data

US 2014/0111794 A1   Apr. 24, 2014

(51) Int. Cl.
*G01N 21/00* (2006.01)
*G01M 11/00* (2006.01)

(52) U.S. Cl.
CPC ......... *G01M 11/3145* (2013.01); *G01M 11/335* (2013.01)
USPC ...................................................... 356/73.1

(58) Field of Classification Search
CPC .......... G01M 11/3145; G01M 11/335; G01M 11/33; G01M 11/3109; G01M 11/338
USPC .......................................... 356/73.1; 342/159
See application file for complete search history.

(56) References Cited

U.S. PATENT DOCUMENTS

| | | | |
|---|---|---|---|
| 4,361,402 A | 11/1982 | Costa | |
| 4,365,449 A | 12/1982 | Liautaud | |
| 4,391,516 A | 7/1983 | Boggs et al. | |
| 4,551,020 A | 11/1985 | Reid et al. | |
| 4,847,851 A | 7/1989 | Dixon | |
| 4,894,795 A * | 1/1990 | Whitehouse et al. | 708/801 |
| 6,626,043 B1 | 9/2003 | Bailey et al. | |
| 7,352,474 B2 | 4/2008 | Bachim et al. | |
| 7,559,706 B2 | 7/2009 | Tammela et al. | |
| 7,817,258 B2 | 10/2010 | Kristensen et al. | |
| 8,111,386 B2 | 2/2012 | Nicholson et al. | |
| 8,373,852 B2 | 2/2013 | Ruchet et al. | |
| 8,405,836 B2 | 3/2013 | Yablon | |
| 2002/0018287 A1 | 2/2002 | Zellmer et al. | |
| 2004/0105144 A1 | 6/2004 | Yang et al. | |
| 2007/0297044 A1 | 12/2007 | Qiao et al. | |
| 2009/0125242 A1 | 5/2009 | Choi et al. | |
| 2009/0201953 A1 | 8/2009 | Peyghambarian et al. | |
| 2009/0252468 A1 | 10/2009 | Sugizaki et al. | |
| 2009/0262337 A1 | 10/2009 | Nicholson et al. | |
| 2009/0296199 A1 | 12/2009 | Franjic et al. | |

(Continued)

FOREIGN PATENT DOCUMENTS

WO    2010133488 A1    11/2010

OTHER PUBLICATIONS

Jasapara et al, "Spectrogram approach to S2 fiber mode analysis to distinguish between dispersion and distributed scattering," Optics Letters, vol. 37, No. 18, pp. 3906-3908, Sep. 15, 2012.

(Continued)

*Primary Examiner* — Tarifur Chowdhury
*Assistant Examiner* — Md Rahman
(74) *Attorney, Agent, or Firm* — Berkeley Law & Technology Group, LLP

(57) ABSTRACT

Subject matter disclosed herein relates to measuring modes of a waveguide.

33 Claims, 9 Drawing Sheets

(56) References Cited

U.S. PATENT DOCUMENTS

| | | | |
|---|---|---|---|
| 2010/0090884 A1* | 4/2010 | Venkatachalam et al. | 342/159 |
| 2010/0124394 A1 | 5/2010 | Meek et al. | |
| 2012/0093272 A1* | 4/2012 | Kimata | 375/348 |
| 2012/0105831 A1 | 5/2012 | Nicholson et al. | |
| 2012/0134011 A1 | 5/2012 | Fujiwara et al. | |
| 2012/0232385 A1 | 9/2012 | Hattori et al. | |

OTHER PUBLICATIONS

Nicholson et al, "Measuring high-order modes in a low-loss, hollow-core, photonic-bandgap fiber," Optics Express, vol. 20, No. 18, pp. 20494-20505, Aug. 27, 2012.

Nicholson et al, "Measuring the Modal Content of Large-Mode-Area Fibers," IEEE Journal of Selected Topics in Quantum Electronics, vol. 15, No. 1, pp. 61-70 Mar. 4, 2009.

Jespersen et al, "Measuring Distributed Mode Scattering in Long, Few-Moded Fibers," in Optical Fiber Communication Conference, OSA Technical Digest (Optical Society of America, 2012), paper OTh31.4, 3 Pages.

Nguyen et al, "Modal decomposition technique for multimode fibers," Applied Optics, vol. 51, No. 4, pp. 450-456 Feb. 1, 2012.

Nicholson et al, "Spatially and spectrally resolved imaging of modal content in large-mode-area fibers," Optics Express vol. 16, No. 10, pp. 7233-7243, May 12, 2008.

Nguyen et al, "Scalar product technique in modal decomposition for multimode fibers," Optical Modelling and Design, Proceedings of the SPIE, vol. 7717, pp. 77170V-1-77170V-10, 2010.

Nicholson et al, "Characterization of higher-order-mode content in a large-mode-area fibers," in Conference on Lasers and Electro-Optics/Quantum Electronics and Laser Science Conference and Photonic Applications Systems Technologies, OSA Technical Digest (Optical Society of America, 2008), paper CMB4, 2 Pages.

Blin et al, "Simple Modal Analysis Method for Multi-Mode Fibers," ECOC 2009—35th European Conference on Optical Communication, 2 Pages, Sep. 20-24, 2009.

Nicholson et al, "Characterizing Discrete and Distributed Scattering of Higher-Order-Modes in Large-Mode-Area Fibres," ECOC 2008, 34th European Conference on Optical Communication, 2 Pages, Sep. 21-25, 2008.

Nicholson et al, "Measuring the Modes of Optical Fibers using S2 Imaging," in Conference on Lasers and Electro-Optics, OSA Technical Digest (CD) (Optical Society of America, 2010), paper CWL1, 2 Pages.

Nicholson et al, "Characterizing the modes of a core-pumped, large-mode area Er fiber using spatially and spectrally resolved imaging," in Conference on Lasers and Electro-Optics/International Quantum Electronics Conference, OSA Technical Digest (CS) (Optical Society of America, 2009), paper CWD4, 2 Pages.

Desantolo et al, "High resolution S2 mode imaging of photonics bandgap fiber," in CLEO:2011—Laser Applications to Photonic Applications, OSA Technical Digest (CD) (Optical Society of America, 2011), paper CFM4, 2 Pages.

Blin et al "New methods for Modal Decomposition in Multi-Mode fibres," in 20th International Conference on Optical Fibre Sensors, Proc. of SPIE vol. 7503, 2009, 4 Pages.

U.S. Appl. No. 13/350,626: Notice of allowance, mailed May 12, 2014, 11 pages.

U.S. Appl. No. 12/728,147, filed Mar. 19, 2010, 49 pages.

U.S. Appl. No. 12/728,147: Filing receipt, mailed Mar. 30, 2010, 3 pages.

U.S. Appl. No. 12/728,147: Notice of publication, mailed Sep. 22, 2011, 1 page.

U.S. Appl. No. 12/728,147: Non-Final Office Action, mailed Jul. 17, 2012, 17 pages.

U.S. Appl. No. 12/728,147: Response to Non-Final Office Action, mailed Oct. 16, 2012, 21 pages.

U.S. Appl. No. 12/728,147: Notice of Allowance and Fees Due, mailed Jan. 17, 2013, 9 pages.

U.S. Appl. No. 12/728,147: Issue fee payment, mailed Feb. 21, 2013, 5 pages.

U.S. Appl. No. 12/728,147: Issue notification, mailed Mar. 6, 2013, 1 page.

U.S. Appl. No. 13/350,626, filed on Jan. 13, 2012, 37 pages.

U.S. Appl. No. 13/350,626: Filing receipt, mailed Feb. 7, 2012, 3 pages.

U.S. Appl. No. 13/350,626: Non-Final Office Action, mailed Jun. 19, 2013, 16 pages.

U.S. Appl. No. 13/350,626: Notice of publication, mailed Jul. 18, 2013, 1 page.

U.S. Appl. No. 13/350,626: Response to Non-Final Office Action, mailed Aug. 30, 2013, 18 pages.

U.S. Appl. No. 13/350,626: Final Rejection, mailed Oct. 10, 2013, 16 pages.

U.S. Appl. No. 13/350,626: Response after final, mailed Dec. 10, 2013, 24 pages.

U.S. Appl. No. 13/350,626: Non-Final Rejection, mailed Jan. 23, 2014, 18 pages.

U.S. Appl. No. 13/350,626: Applicant interview summary, mailed Apr. 14, 2014, 3 pages.

U.S. Appl. No. 13/350,626: Non-Final Office Action Response, mailed Apr. 23, 2014, 11 pages.

D. Marcuse, "The Transverse Interferometric Method (TIM)" Principles of Optical Fiber Measurements, 1981, Chapter 4, pp. 150-161, Academic Press, New York, USA.

M. Sochacka, "Optical Fibers Profiling by Phase-Stepping Transverse Interferometry," IEEE Journal of Lightwave Technology, 1994, pp. 19-23, vol. 12, No. 1, IEEE, Piscataway, NJ, USA.

P. L. Chu and T. Whitbread, "Nondestructive determination of the refractive index profile of an optical fiber: fast Fourier transform method," Applied Optics, 1979, pp. 1117-1122, vol. 18, No. 7, OSA, Washington, DC, USA.

G. A. Dunn and D. Zicha, "Using the DRIMAPS System of Transmission Interference Microscopy to Study Cell Behavior," Cell Biology a Laboratory Handbook 2nd edition, 1998, pp. 44-53, vol. 3, Academic Press, New York, USA.

M. R. Hutsel et al, "Algorithm performance in the determination of the refractive-index profile of optical fibers," Applied Optics, 2008, pp. 760-767, vol. 47, No. 6, OSA, Washington, DC, USA.

H. M. Presby and I. P. Kaminow, "Binary silica optical fibers: refractive index and profile dispersion measurements," Applied Optics, 1976, pp. 3029-3036, vol. 15, No. 12, OSA, Washington, DC, USA.

A. Yang et al, Measuring the refractive indices of liquids with a capillary tube interferometer, Applied Optics, 2006, pp. 7993-7998, vol. 45, No. 31, OSA, Washington, DC, USA.

F. El-Diasty, "Characterization of optical fibers by two- and multiple-beam interferometry," Optics and Lasers in Engineering, 2008, pp. 291-305, vol. 46, No. 4, Elsevier, Ltd., Amsterdam, Holland.

A. D. Yablon, "Refractive Index Profiling of Fibers and Fusion Splices," Optical Fiber Fusion Splicing, 2005, pp. 199-202, Springer, New York, USA.

A. D. Yablon, "Multi-Wavelength Optical Fiber Refractive Index Profiling by Spatially Resolved Fourier Transform Spectroscopy," IEEE Journal of Lightwave Technology, 2010, pp. 360-364, vol. 28, No. 4, IEEE, Piscataway, NJ, USA.

A. D. Yablon, "Multi-Wavelength Optical Fiber Refractive Index Profiling by Spatially Resolved Fourier Transform Spectroscopy," OFC/NFOEC, 2009, Postdeadline paper PDPA2, OSA, Washington, DC. USA.

A. D. Yablon, "Multiwavelength optical fiber refractive index profiling," Fiber Lasers VII: Technology, Systems, and Applications, 2010, proceedings of the SPIE vol. 7580, paper No. 40, SPIE, Bellingham, WA, USA.

P. Hariharan, "Modified Mach-Zehnder Interferometer," Applied Optics, 1969, pp. 1925-1926, vol. 8, No. 9, OSA, Washington, DC, USA.

L. M. Boggs et al, "Rapid Automatic Profiling of While-Fiber Samples: Part I," Bell System Technical Journal, 1979, pp. 867-882, vol. 58, No. 4, AT&T, New York, USA.

H. M. Presby et al, "Rapid Automatic Profiling of While-Fiber Samples: Part II," Bell System Technical Journal, 1979, pp. 883-902, vol. 58, No. 4, AT&T, New York, USA.

(56) References Cited

OTHER PUBLICATIONS

B. L. Bachim and T. K. Gaylord, "Microinterferometric optical phase tomography for measuring small, asymmetric refractive-index differences in the profiles of optical fibers and fiber devices," Applied Optics, 2005, pp. 316-327, vol. 44, No. 3, OSA, Washington, DC, USA.

B. L. Bachim, T. K. Gaylord, and S.C. Mettler, "Refractive-index profiling azimuthally asymmetric optical fibers by microinterferometric optical phase tomography," Optics Letters, 2005, pp. 1126-1128, vol. 30, No. 10, OSA, Washington, DC, USA.

Kirchhof, et al, "Spatial Distribution Effects and Laser Efficiency in Er/Yb Doped Fibers," Spie, vol. 5350, Bellingham, WA, 2004. pp. 222-233.

Unger, et al, "Codoped Materials for High Power Fiber Lasers-Diffusion Behaviour and Optical Properties," SPIE, vol. 6469, Downloaded Dec. 17, 2010, pp. 6469131-646913-12.

Yablon, "Measuring the Spatial Distribution of Rare-Earth Dopants in High-Power Optical Fibers," SPJE, Val. 7914, 2011, pp. 79141N-1-79141N-8.

Yablon, "New Transverse Techniques for Characterizing High-Power Optical Fibers," Optical Engineering, vol. 50(11), Nov. 2011, pp. 111603-1-111603-6.

C. Degen, I. Fischer and W. ElsaBer, "Transverse modes in oxide confined VCSELs: Influence of pump profile, spatial hole burning, and thermal effects," Aug. 2, 1999 I vol. 5, No. 3 I Optics Express 38.

Tajamal Bhutta et al, "Spatial dopant profiles for transverse-mode selection in multimode waveguide", Jul. 2002, vol. 19, No. 7/Optical Society of America.

U.S. Appl. No. 13/350,626, Issue Fee Payment, Filed Aug. 12, 2014, 4 pages.

\* cited by examiner

SYSTEM AND/OR METHOD FOR MEASURING WAVEGUIDE MODES

BACKGROUND

1. Field

Subject matter disclosed herein relates to measuring waveguides, such as, for optical fibers or planar waveguides, for example.

2. Information

Waveguides, such as optical waveguides, including, for example, planar waveguides and/or optical fibers, may guide electromagnetic radiation, commonly referred to as "light," in one or more transverse modes. Likewise, the terms electromagnetic radiation and optical signals or similar terms are used interchangeably. A transverse mode with respect to a beam of electromagnetic radiation refers to an electromagnetic field pattern of radiation that may be measured in a plane substantially perpendicular or transverse to beam propagation direction. Waveguides that support multiple propagation paths, e.g., more than one transverse mode, for example, are called multi-mode waveguides. Likewise, optical fibers that support multiple propagation paths, such as more than one transverse mode, for example, are called multi-mode fibers (MMF), while those that support a single transverse mode are called single-mode fibers (SMF).

Optical waveguides (e.g., optical fibers) may be incorporated into any of a variety of devices. An example of a device comprises a beam combiner that is able to multiplex optical signals from multiple optical fibers into a single optical fiber. Another example of a device incorporating optical waveguides comprises a mode field diameter adaptor in which a mode field of a fiber may be converted to a differently-sized and/or differently-shaped mode field. Yet another example of a device comprises an optical fiber amplifier in which optical signals, which may travel along or through an optical fiber, such as via a core-guided mode, may be amplified by providing additional optical energy, such as via an optical pump, for example.

In many types of optical fibers, optical fiber devices, or more generally waveguides, a useful parameter may involve distribution of optical energy among various guided modes, which may, for example, include one or more modes guided by a fiber core and also may include one or more modes guided by cladding material. Mode or modes, of course, are understood to refer to a guided mode or to guided modes. Understanding energy distribution across various modes and/ or energy exchange between various modes for a waveguide (e.g., an optical fiber or an optical fiber device) may be desirable for a variety of reasons, including, for example, evaluating performance of potential devices that may employ waveguides, such as fibers.

BRIEF DESCRIPTION OF THE DRAWINGS

Non-limiting and/or non-exhaustive embodiments will be described with reference to the following figures, wherein like reference numerals refer to like parts throughout various figures unless otherwise specified.

DETAILED DESCRIPTION

Figure 1:
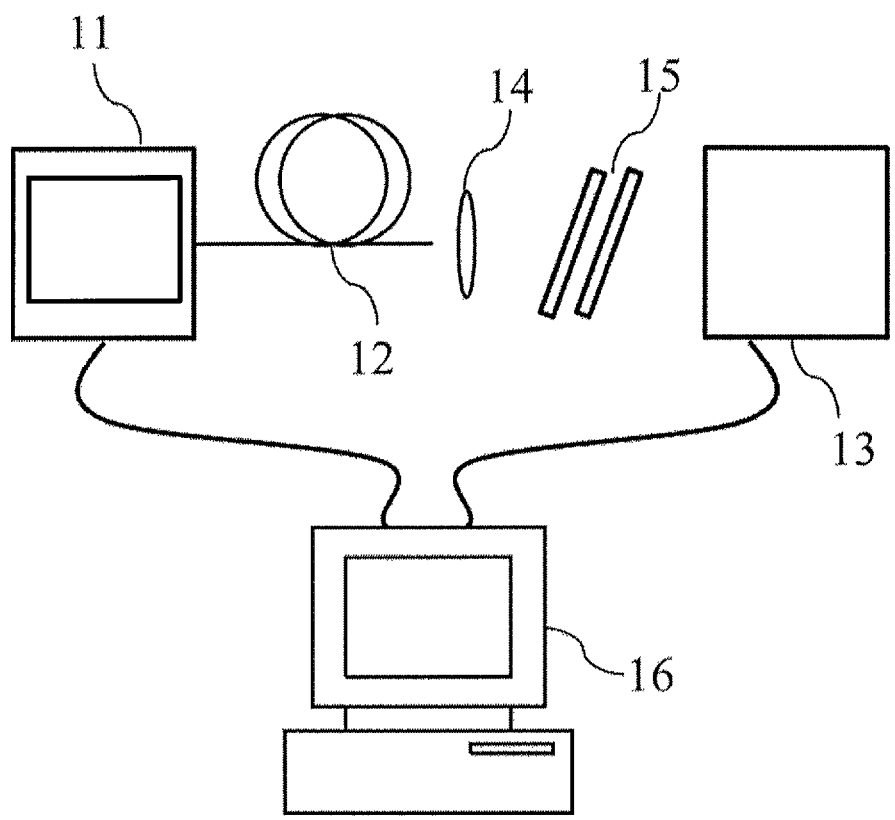
FIG. 1 is a schematic diagram illustrating an embodiment of a system for measuring waveguide modes.

Waveguides may support multiple modes of propagation that may differ in their spatial distribution of energy, such as optical energy. In this context, as previously suggested, the term optical or similar terms are intended to mean relating to electromagnetic radiation. Thus, for example, optical energy refers to light energy. In an embodiment, a system or technique may characterize (e.g., measure, estimate and/or quantify) distribution of energy among various modes in an optical waveguide. In this context, the term waveguide or similar terms, such as optical waveguide or optical fiber, are intended to mean a medium capable of transmitting electromagnetic signals, such as optical signals, using total internal reflection or using a photonic band gap process. For example, an optical fiber may comprise a relatively slender cylinder or fiber made of any of a number of materials, such as glass or polymer, as non-limiting examples. An optical fiber may have a cross-sectional shape comprising any of a number of geometrically closed form shapes, such as circular, oval, rectangular, just to name a few non-limiting examples. Measurements to estimate distribution of energy among various modes in an optical waveguide may be useful for a variety of purposes, such as, for example, a number of commercial and/or research applications. The term 'between' or similar terms are understood to include 'among' or similar terms and vice-versa, if appropriate in context. Furthermore, the terms measure, estimate, quantify, characterize or similar terms are used interchangeably throughout this disclosure and understood in this manner without loss of generality.

Optical signals may propagate along a waveguide (e.g., a fiber) in a fundamental mode or a dominant mode, for example. The term dominant mode refers to a mode with the greatest energy on a relative basis compared to other realized modes. The term fundamental mode refers to a mode having the lowest phase velocity for a particular polarization state and optical frequency. There can be more than one fundamental mode, for example, a fiber could have a multiplicity of substantially similar cores having a fundamental mode with a substantially similar phase velocity. Guided modes may also have multiple polarization states. Two modes with a substantially similar spatial distribution, for example, may have different polarization states and different group velocities. It is noted that a fundamental mode is typically a dominant mode, but not necessarily always. Furthermore, optical signals may also propagate in other modes. Accordingly, it may be beneficial, for example, to characterize or quantify energy propagating in higher order modes (HOMs) other than a fundamental mode (or a dominant mode), for example. HOMs refers to modes other than a fundamental mode, which travel at a higher phase velocity than the fundamental mode. Embodiments of claimed subject matter may, for example, include techniques or systems for characterizing or quantifying energy distribution as a result of interference between propagating optical signals (e.g., interfering guided modes). Since modes may interfere, having this capability may be useful, for example, in connection with device design and/or assembly, for example, as previously indicated.

In an embodiment, a system for characterizing distribution of energy among various potentially interfering modes (e.g., guided modes) in a waveguide may include, for example, an optical source, a fiber-under-test (FUT), an optical detector and/or a computing device (e.g., processor) described in more detail infra. Of course, it is understood that the term FUT includes a waveguide. In an embodiment, a computing device, such as, for example, a computer, may, at least partially, generate commands for an optical source, process electronic signals, and/or store electronic signals, wherein electronic signals may be processed and/or stored, such as in or into one or more useful forms. In this context, terminology, such as process and/or store electronic signals, or similar terms are meant to include converting electronic signals to another electronic signal form, typically at least in part as a result of having executed code, such as code readable by a computing device (e.g., processor), for example.

An optical source may provide optical signals to a FUT via a technique to at least partially characterize its modal energy distribution as a result of interference between optical signals propagating along or through the FUT. In one implementation, different wavelengths of optical signals may be produced simultaneously or substantially simultaneously by an optical source (e.g., a broadband light source). In another implementation, different wavelengths of optical signals may be produced sequentially by an optical source (e.g., a tunable laser), as described in more detail infra.

In an embodiment, as suggested previously, various modes of optical signals propagating along an optical fiber may interfere. Optical signal interference may manifest itself as variations in optical power substantially as a function of wavelength. For example, photons may be measured at an end of an FUT, referred to here as an output face, to quantify optical signal interference. For example, a FUT may be included in an arrangement so that photons having propagated along or through the FUT may be collected at an output face, such as via collection optics, for example, to be recorded (e.g., stored) or so that photons having propagated along or through the FUT are imaged onto an image plane, again, for example, to be recorded (e.g., stored).

For example, interfering optical signals propagating in different modes of an FUT may travel at different group velocities over a corresponding length of fiber, and the differential group velocity is referred to in this context as intermodal group velocity. The propagation time difference between two modes over a portion of the FUT is termed intermodal group delay. In this context, group refers to a grouping (e.g., signal packet) of optical signals for a particular waveguide mode. Optical power may vary with frequency of oscillation in a manner that may relate to group velocity differences between interfering modes, for example. Therefore, signal measurements (e.g., signal sample values) of an interference pattern of optical signals spatially distributed at an image plane (e.g., corresponding to an output face), for example, may be used to estimate energy distribution for various guided modes of a FUT. For example, at an output face, signal measurements corresponding to various pixel locations may be taken. One may think of pixel location, such as for an output face, in terms of location in a flat x,y-plane substantially perpendicular to direction of signal propagation, for example, at the output face. In this context, a capability to characterize or quantify signal measurements (e.g., signal sample values) substantially in accordance with pixel location at an image plane, such as corresponding to an output face, as an example, is referred to as being spatially resolved. If there are multiple optical paths available to signals traveling inside a FUT, spectral interference may be observed as beating in an optical frequency domain, for example. Thus, a spatially-resolved beating pattern of optical signals may be obtained in an embodiment, for example. Such measurements in an embodiment, for example, may be employed to estimate modal energy distribution and/or modal energy transfer between modes from optical signal interference. Spatial resolution of a beating pattern may be useful for accurate and/or convenient identification of particular spatial modes participating in a beating pattern.

However, as explained in more detail below, if intermodal group delay is similar at a particular optical wavelength, for example, so as not to be sufficiently resolved, estimates of modal energy distribution and/or modal energy transfer may be at least partially incorrect. Design, assembly or other commercial uses of optical waveguides may, therefore, be adversely affected at least partially as a result. In this context, intermodal group velocity being sufficiently resolved refers to an ability to identify potentially separate sources of intermodal group delay, such as for non-fundamental modes, even in situations in which intermodal group delay (or intermodal group velocity) may be reasonably similar. For example, in situations in which intermodal group delay may not be well-resolved at one particular wavelength, it may be better resolved at a different wavelength.

In an embodiment, as suggested previously, signal measurements (e.g., signal sample values) may be collected at multiple spatial points or locations in an image plane, for example, Processing may include employing a transform of spectra-related signal measurements at individual spatial points, such as, for example, a Fourier transform. Of course, a variety of transforms, such as between domains (e.g., time and frequency), may be employed and produce satisfactory results. Therefore, it is not intended that claimed subject matter be limited to a particular transform, such as a Fourier transform or a discrete Fourier transform (DFT), for example. Likewise, it is noted that spectra-related signal measurements may be collected at even or uneven intervals of frequency, for example. If desirable, measurements at uneven intervals may be interpolated to become at least approximately equally spaced in frequency, although, claimed subject matter is not limited in scope in this respect. For example, use of a discrete Fourier transform (DFT) process may make having at least approximately equal frequency intervals convenient for performing signal processing related computations. However, since claimed subject matter is not limited to employing a DFT, in some situations, approximately equal frequency intervals may not necessarily result in additional computation convenience and so may not necessarily be employed in an embodiment.

Since spectra-related signal measurements may be considered to be optical frequency domain measurements, employing a transform, such as a Fourier transform, may convert measurements from frequency domain measurements into time domain measurements, if desired. In some situations, however, it might be more convenient to process spectra-related signal measurements without transform conversion. Regardless of whether signal measurements are transformed or not, it may likewise be convenient to employ normalization, although, again, claimed subject matter is not limited to employing normalization. Nonetheless, as an example, length of a FUT may affect measurement scale. Therefore, normalization may take into account waveguide length for comparisons of signal measurements, for example. Of course, a host of approaches to normalization exist or may be devised. Therefore, claimed subject matter is not limited in scope to a particular normalization approach.

Spectral beats observed or measured in a frequency domain representation of signal measurements may likewise be manifested in a time domain representation as well. Optical energy traveling inside an FUT may be exchanged between distinct modes in a scattering process. Therefore, a one-dimensional time domain representation (e.g., a plot of time versus amplitude) of optical signal measurements (e.g., signal sample values), such as, for example, illustrated by plot 310 of FIG. 3, may indicate greater or lesser transfer of energy at particular intermodal group delays. A one-dimensional representation is conventionally plotted in connection with waveguide signal measurements and shall be discussed in greater detail below. However, peaks in a one dimensional representation, again, as illustrated by 310 in FIG. 3, may correspond to more energy transfer or greater scattering.

Figure 3:
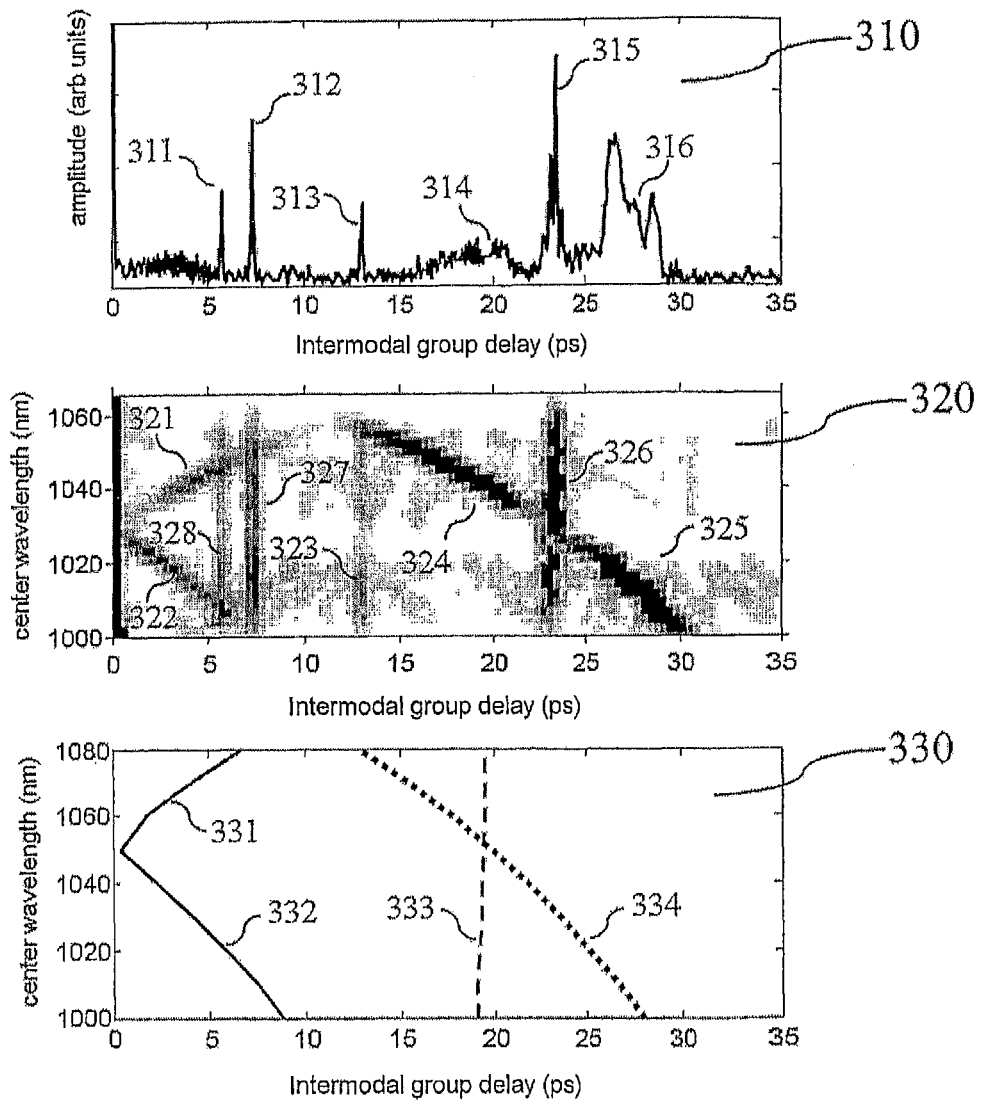
FIG. 3 are plots respectively illustrating a one-dimensional chart, a corresponding two-dimensional spectrogram illustrating a multi-dimensional spectrogram embodiment, and simulated results for a corresponding two-dimensional spectrogram illustrating a multi-dimensional spectrogram embodiment.

It is noted that a peak may be narrow and look like an energy spike, referred to as a narrow peak, and illustrated, for example, by peak 315 in spectra 310 of FIG. 3. Likewise, a peak may be less narrow, referred to as a broadened peak, and illustrated, for example, by peak 314 in FIG. 3. However, since terms like narrow or broad (e.g., broadened) are generally understood to be relative, for at least some embodiments, it may be useful, for example, to quantify a width of the curve around (e.g., near) such peaks in such representations at least for comparison.

Although claimed subject matter is not limited in scope in this respect, one might consider a length of an interval formed by corresponding locations on a curve respectively at a 3 dB fall off preceding a peak and at a 3 dB fall off after that peak, referred to here as a width, for example. Thus, peaks in a one dimensional plot, for example, having such widths at or above an amount, such as X, may be described as a broadened peak. Likewise, peaks in a one dimensional plot, for example, having such widths below an amount, such as Y, may be described as a narrow peak. Values of X and Y may be the same or may be different, although if different for a particular curve, X should exceed Y. Likewise, it is assumed that appropriate normalization, as previously described, may in at least some instances also be employed in connection with computations related to width, so to speak.

Aspects regarding modal energy transfer in connection with optical signal interference may be associated with curve characteristics, such as a narrow or broadened peak. For example, a narrow peak may indicate a "discrete scattering" event. For such an event, scattering may have occurred at a discrete location along a waveguide or fiber, thereby producing a particular optical delay difference for optical signals propagating along or through the waveguide or fiber. As an example, a fiber interconnection, e.g., where separate fibers have been combined, including, as examples, splicing, welding, etc., might potentially be manifested as a narrow peak type characteristic in a one dimensional plot.

In contrast, scattering may also have occurred distributed along a length of an optical waveguide, such as a fiber, which may instead be manifested as a broad peak type characteristic in a one dimensional plot. Distributed scattering along a waveguide may be a result of a variety of potential situations of interest. For example, structure of a waveguide and/or properties of materials forming a waveguide may be associated with examples of distributed scattering. Alternatively distributed scattering, as an example, may result if a fiber is coiled to a tight diameter so that energy may be converted from one propagating mode to another along a length of coiled fiber. However, it may first or initially be desirable to have an ability to reasonably accurately discern whether signal measurements are exhibiting discrete scattering or distributed scattering (or even, perhaps in some cases, another type of optical signal scattering that might not be easily characterized as either discrete or distributed, for example).

For example, a broadened peak in one-dimensional plot conventionally may be interpreted to be a result of distributed scattering, rather than a result of discrete scattering. However, if a waveguide has a mode in which optical mode group velocity varies with wavelength, a discrete scattering event (e.g., due at least in part to a fiber interconnection) that transfers energy to this mode may appear as a broadened peak in a one dimensional spectrogram. Therefore, the conventional approach, described above, using a one-dimensional representation, may be subject to error. For an embodiment of claimed subject matter, by contrast, as described below, a technique may be implemented so that a discrete scattering, such as this latter example, may be appropriately identified as such.

In an embodiment, spectra-related signal measurements may be collected at multiple spatial points in an image plane, as was described above. Processing of signal measurements may include employing a transform to convert signal measurements from an optical frequency domain to a time domain (or vice-versa if applicable). However, in an embodiment, to sufficiently resolve intermodal group delay, for example, a range of frequencies may be divided into sub-ranges or sub-windows. It is noted, further, that the term frequency or similar terms are used interchangeably with the term wavelength or similar terms throughout this specification with no loss in meaning or generality. Also, in this context, the term sub-range or similar terms are intended to be interchangeable with the term sub-window or similar terms, again, with no loss of generality.

A particular sub-range or sub-window in a range of frequencies may comprise a relatively narrow range of a broader range. Accordingly, a broad spectrum may comprise a plurality of sub-ranges. In one embodiment, sub-ranges may comprise at least approximately correspondingly-sized spectral widths for convenience of computation, such as in connection with use of a DFT, although claimed subject matter is not limited in this respect. Likewise, although, again, not required; nonetheless, in an embodiment, immediately neighboring sub-windows or sub-ranges may overlap with one another. For example, measurements collected over a broad spectrum of wavelengths from about 1000 nm to about 1070 nm may be partitioned into 28 smaller sub-windows, individually approximately 8.0 nm wide and overlapping by approximately 6.0 nm with immediately neighboring sub-windows. Other examples of useful bands for measurement may include 1500 to 1600 nm, etc.

In an embodiment, a transform may be performed for separate sub-windows. A particular spectral width for a sub-range or sub-window may be employed based, at least in part, on balancing trade-offs. For example, a wider spectral width may offer finer resolution of intermodal group delay, whereas a smaller spectral width may reduce smearing of features that may vary with wavelength. A sub-range or a spectral width may be employed so as to have a capability to sufficiently resolve variations of intermodal group delay relative to a center wavelength, for example. Likewise, in an embodiment, a computing device, for example, may perform signal processing using a variety of spectral widths. Furthermore, an embodiment may evaluate resulting features for a variety of spectral widths to select or recommend a spectral width n interval to be employed. Likewise, one or several spectral widths may be capable of being specified by a user in an embodiment.

Figure 7:
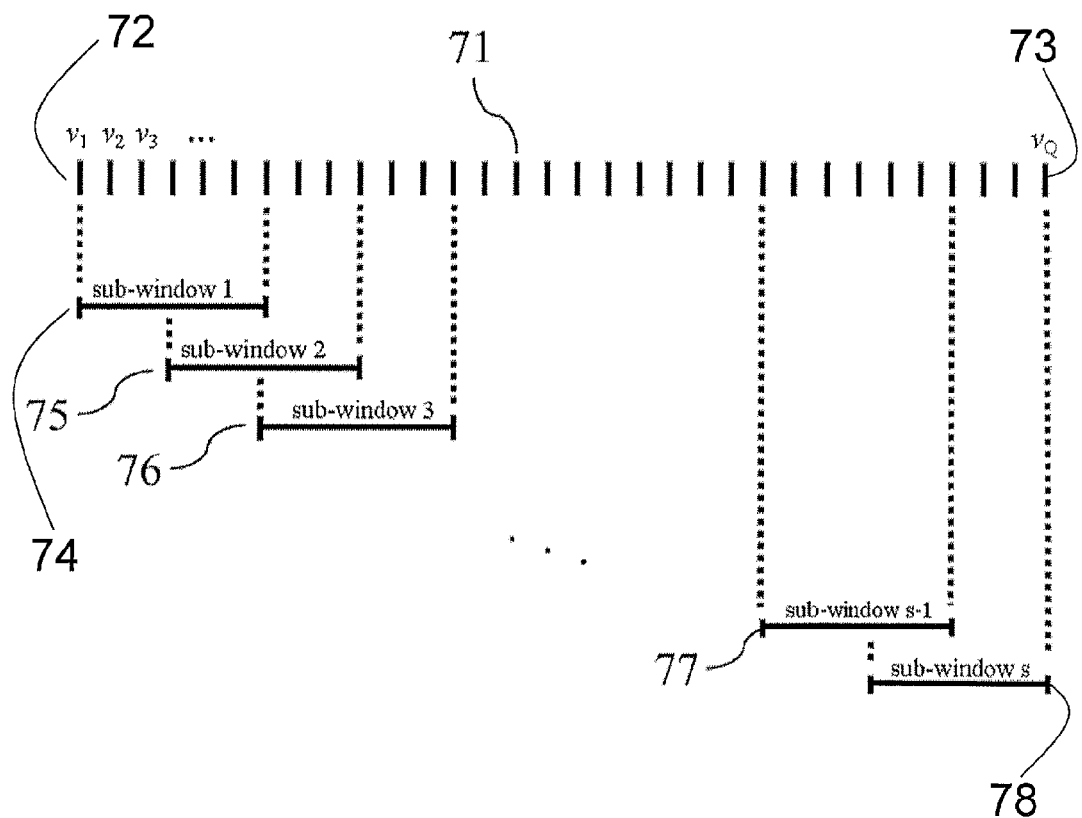
FIG. 7 is a schematic diagram illustrating an embodiment of ranges or sub-ranges for optical spectra.

As a non-limiting illustrative example, FIG. 7 schematically illustrates a staggered set of sub-ranges 74-78 selected from a broad spectrum 71, according to an embodiment. Spectrum 71 may be based, at least in part, on a set of signal measurements (e.g., signal sample values) for pixel locations in an image plane corresponding to an object plane, such as an output face of a waveguide, as previously described. Measurements corresponding to pixel locations (e.g., portions or sub-portions of images) may be interpolated at substantially evenly spaced frequency intervals $\Delta v$, from $v_1$ to $V_Q$, for example. Of course, as mentioned previously, substantially evenly spaced frequency intervals are not necessary, but may be convenient for some calculations. An optical source, such as 61, for example, may emit optical signals from optical frequency 72 ($v_1$) to optical frequency 73 ($v_Q$). Therefore, in this example, s sub-windows or sub-ranges may overlap with one another, as shown in FIG. 7. Again, overlap is also not necessary but may be desirable for some implementations at least. Therefore, details of sub-ranges, such as this example, are merely an illustration and claimed subject matter, therefore, is not so limited.

Transforms of signal measurements may be assembled into a multi-dimensional spectrogram or a one-dimensional representation, as previously illustrated, such as in FIG. 3. However, in a multi-dimensional spectrogram for a particular implementation, in a two-dimensional spectrogram, for example, an axis may be employed to correspond to center wavelengths of individual sub-windows and the other axis may be employed to correspond to group velocity differences (or equivalently, group time delay). As shall be explained, a multi-dimensional approach, such as a two-dimensional spectrogram, for example, may provide advantages over a one-dimensional representation. For example, in an embodiment, risk of incorrectly perceiving a discrete scattering event as distributed scattering from signal measurements may be reduced.

MPI (multipath interference) may be quantified in an embodiment as power of propagating signals contained in a particular mode relative to power of propagating signals contained in another (e.g., dominant) mode, which may comprise a fundamental mode, for example. MPI, therefore, may comprise a ratio between a power calculation for a dominant propagating mode and a power calculation for a weaker propagating mode. In one particular embodiment, therefore, an expression of MPI in decibel (dB) units may be obtained from MPI density components $C_{sf}$ produced during generation of a spectrogram:

$$MPI_s = 10 \log_{10} \{\Sigma_f C_{sf}\} \quad (6)$$

where $MPI_s$ comprises the MPI for the energy found over f in sub-window s. In an embodiment, collection of F indices f for summation may be chosen, for example, based, at least in part, on proximity to a streak in a spectrogram (indicative of discrete scattering) or proximity to a broad region of distributed scattering, for example. Relation (6) provides another benefit in allowing calculations of MPI from $C_{sf}$ without performing inverse transforms, for example, such as an inverse DFT, as explained in more detail infra.

Multipath interference (MPI) may be calculated using previously described signal measurements. For example, signal measurements may be converted to a time domain, as previously described. Observed signal mode time delay differences, referred to previously as intermodal group delay, result from differences in optical group velocity between modes. However, differences across a variety of modal or intermodal comparisons may contribute energy for a particular corresponding intermodal group delay. To compute MPI, also referred to as MPI values or MPI density, signal measurements may therefore be summed, for example, to estimate energy distribution between a dominant mode, typically a fundamental mode, and less dominant modes, typically higher order modes. In an embodiment, signal measurements converted to a time domain may, for example, be converted back to a frequency domain and summed appropriately to produce a value or a density. However, alternatively, MPI density coefficients, denoted as $C_{sf}$, may be summed without performing an inverse transform from a time domain to a frequency domain, described in more detail infra. Such an approach may be more convenient, easier to implement and/or may potentially be a more efficient calculation, since MPI density coefficients $C_{sf}$ obtained from signal measurements, again, may be used to generate desired estimates without performing an inverse transform. In another implementation, also described infra., a spectrogram approach may allow for estimating variation of MPI density as a center wavelength varies, potentially identifying variations in power that might otherwise not be easily observable, for example.

In an embodiment, a method for characterizing distribution of energy among various modes may comprise measuring optical signals emitted from a waveguide at a plurality of wavelengths. As previously mentioned, measurements may be for a plurality of locations with respect to a spatially-resolved optical detector, for example. As also previously mentioned, measurements may be converted from a frequency domain to a time domain by performing a transform using sub-windows of a range of wavelengths. An embodiment may further comprise calculating MPI density coefficients without converting (e.g., without an inverse transform, for example) from a time domain to a frequency domain. In one implementation, an optical signal may be based, at least in part, on an optical source sequentially providing light having different optical wavelengths to an input face of a FUT. In another implementation, an optical signal may be based, at least in part, on an optical source simultaneously or substantially simultaneously providing light having different optical wavelengths to an input face of a FUT.

In an embodiment, a detector, such as an optical detector, may characterize a near-field of a FUT as a result of imaging from an output face of the FUT. Alternatively, however, a detector may, for example, characterize a far-field instead. An advantage may include reduced complexity, such as fewer elements (e.g., lenses, etc) to implement imaging. Nonetheless, far-field signal processing may be handled in a manner similar to near-field signal processing. Accordingly, similar MPI density coefficients, a similar spectrogram, and similar MPI may be produced for far-field signal measurements. In an implementation, far field intensity distributions may comprise a Hankel transform of near-field distributions, for example.

FIG. 1 illustrates a system according to an embodiment 10. System embodiment 10 may be used to estimate distribution of energy for a waveguide, as previously described, for example, such as for a range of frequencies. A relatively narrow-line width, wavelength-tunable source 11 may provide optical signals to FUT 12 in a manner so that the signals are able to propagate in a transverse mode. For example, source 11 may comprise a laser, as previously mentioned. Alternatively, source 11 may comprise a tunable broadband source, such as an incandescent lamp, a super luminescent diode, an amplified spontaneous emission source, or a light-emitting diode producing light in a manner to pass through a narrow-line width tunable optical filter, just to name a few non-limiting examples. In one implementation, a wavelength-tunable source 11 may comprise, for example, a tunable laser capable of emitting optical signals having wavelengths for a variety of wavelength ranges, such as between about 1000 nm and about 1070 nm, as a non-limiting example. In another implementation, source 11 may comprise a broadband source capable of emitting optical signals having a relatively broad spectrum. A broadband source may operate with a tunable filter (not shown) to select a relatively narrow portion of a relatively broad spectrum of a broadband source, for example, for propagation of optical signals in a transverse mode, as was mentioned.

Optical signals emitted from an output face, as previously described, for example, may be collected via collection optics, such as, here, lens system 14 and optics 15. In some embodiments, collection optics, in addition to collecting photons, may also result in imaging to an optical detector, such as 13, which may, for example, comprise a spatially-resolved detector in an embodiment. It is noted that optics 15 in an embodiment may comprise a variety of components, such as additional lenses, polarizers, attenuators, and/or spectral filters, for example. For example, an attenuator may comprise a neutral density filter. Alternatively, for polarized signals, an optical attenuator may comprise, for example, a half-wave plate or a Fresnel rhomb coupled to a polarized beam splitter so that optical signals impinging on a detector may be regulated across a broad range, although subject matter is not so limited. Lens system 14 may, likewise, comprise one or more lenses. Collection optics, here comprising 14 and 15, for example, may be arranged in a manner so that optical signal measurements by a spatially-resolved detector, such as 13, are not likely to be affected by spurious optical signals (e.g., reflections). Optical detector 13 may be responsive to a wavelength or wavelength range of optical signals provided by tunable optical source 11. Optical detector 13 may, for example, comprise a silicon charge-coupled device (CCD), complementary metal-oxide semiconductor (CMOS), Indium-Gallium-Arsenide (InGaAs), Mercury-Cadmium-Tellurium (MCT), or other type of optical detector, such as capable of spatial resolution, to provide some non-limiting examples. In an implementation, for instance, a one-dimensional linear array of pixel-sized sensors may be arranged substantially along a first axis. For example, a one-dimensional linear array may be scanned in a direction substantially perpendicular to a first axis to effectively provide a spatially-resolved two-dimensional optical detector. Here, "scanned in a direction" may comprise detecting optical signals at a location oriented substantially perpendicular to the first axis, such as by movement of a linear array, for example. In another implementation, optical detector 13 may comprise a single-pixel-sized sensor that may be raster scanned in two (e.g., substantially perpendicular) directions to effectively provide a spatially-resolved two-dimensional detector. For example, a computing device 16 (e.g., processor) may be used to operate tunable source 11 and to process electronic signals measured at a multiplicity of spatial locations by optical detector 13. As suggested previously, collection optics may channel optical signals (e.g., photons) from an output face of the FUT 12 so as to be received by optical detector 13 in a manner to result in optical signal detection (e.g., signal measurements). FUT 12 may, of course, comprise a variety of fiber or waveguide configurations. As illustrative non-limiting examples, FUT 12 may comprise several distinct waveguides, several distinct optical fibers and/or may include devices for transmission of optical signals via a medium. For example, FUT 12 may also include a fusion splice, a mode field adapter, a tapered fiber bundle, and/or an optical fiber amplifier.

Figure 6:
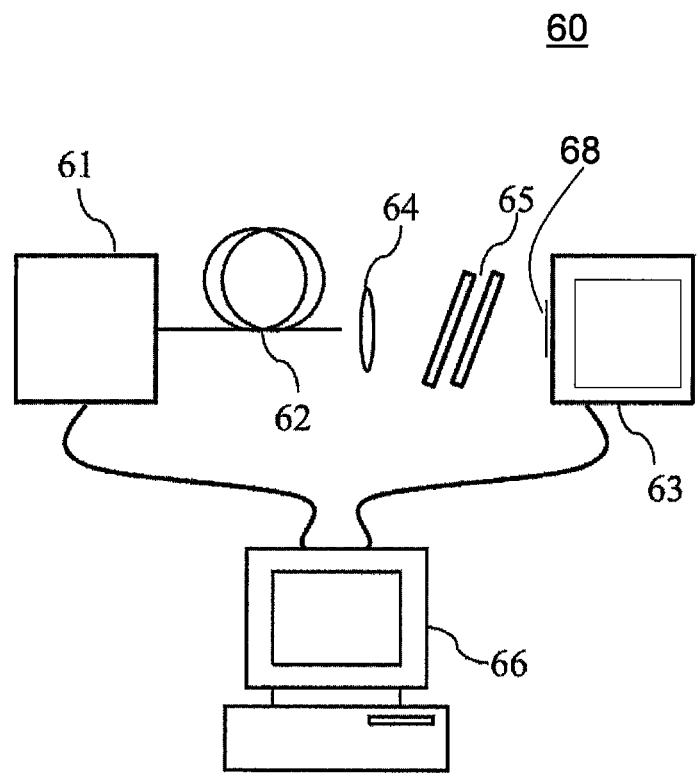
FIG. 6 is a schematic diagram of another embodiment of a system for measuring waveguide modes.

FIG. 6 illustrates a system according to an embodiment 60. System embodiment 60 may also be used to estimate distribution of energy for a waveguide, as previously described, for example, such as for a range of frequencies. For example, a broadband optical source 61 may simultaneously or may substantially simultaneously provide optical signals for a plurality of optical wavelengths to FUT 62. In an implementation, optical source 61 may comprise a broadband source capable of emitting optical signals having a relatively broad spectrum. A sensor 63 may comprise a sensor capable of spatially-resolving and wavelength-resolving optical signals that may impinge on an active region 68 of the sensor, for example. In this context, a capability to capture measurements substantially in accordance with wavelength, for example, at an image plane, such as corresponding to an output face, as an example, is referred to as being wavelength resolved. It is noted that frequency resolved refers to a similar capability regarding frequency, of course. Sensor 63, for example, may be responsive, at least in part, to optical signals, such as received via input port 68. As previously described with respect to FIG. 1, here, collection optics may, for example, include lens system 64 and optics 65. In one example, a system may include a capability to raster scan optical signals (e.g., photons) to an image plane, in addition to photon collection, for example. Likewise, sensor 63 may be coupled to a spectrum analyzer. In another example, a system may include scanning mirrors that are able to project optical signals (e.g., photons) onto an input port of a spectrometer. Sensor 63 may provide electronic signals, corresponding to pixels of an active region of sensor 63, to a computing device, such as 66, which may process electronic signals to generate a spectrogram, for example. Of course, such details of system 60 are merely illustrative examples, and claimed subject matter is not so limited.

Figure 2:
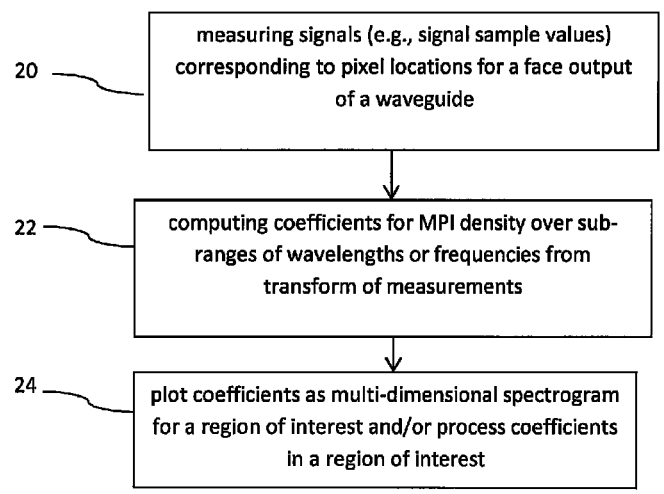
FIG. 2 is a flow diagram illustrating an embodiment of a process to measure waveguide modes.

FIG. 2 is a flow diagram of a process to measure waveguide modes, according to an embodiment 200. For example, energy distribution, as previously described, may be estimated, in an embodiment. Process embodiment 200 may be performed by computing device 16, for example. At block 20, signal measurements (e.g., signal sample values), such as in the form of portions of images, for example, including J pixels, may be obtained by a detector over ranges of wavelengths or frequencies, for example. Signal measurements need not be acquired in monotonic sequence of increasing or decreasing wavelength and signal measurements need not be acquired at uniform intervals of wavelength or frequency, for example. Although not required, it may be convenient for calculation of a DFT, in some situations at least, to interpolate signal measurements to realize a substantially uniform frequency interval, such as, Δv, for example. Measurements may correspond to pixel locations for an output face of a waveguide, which may, for example, be imaged to an image plane, if desired. However, imaging to an image plane is not required because measurements could be performed in the far field without imaging optics. Likewise, as previously discussed, for example, near field or far field optics may alternatively be employed if imaged to an image plane. Therefore, as an example implementation, assume the number of pixels, J, may comprise about 10000, and that there are R distinct images or portions thereof (e.g., signal measurements), where R may comprise 4096 with a frequency interval Δv of about 5 GHz if an optical source emits optical signals in a range from approximately 1000 to approximately 1070 nm, though claimed subject matter is not so limited.

To compute a transform, such as a DFT, for example, individual pixels among J pixels of a set of waveguide face output pixel locations (e.g., R image portion signal measurements) may be grouped in S staggered optical frequency sub-ranges, such as discussed previously in connection with FIG. 7, as an example. Individual S sub-windows or sub-ranges may, for example, include F distinct signal measurements corresponding to a pixel location, for example (although, as indicated previously, multiple pixel locations are sampled for signal sample values or signal measurements) separated by optical frequency interval $\Delta v$ and may overlap with one another in frequency, for example, as previously described and shown in FIG. 7. A transform, such as a DFT in this example, may be separately applied to sub-ranges comprising F signal measurements at particular waveguide face output pixel locations in an x,y plane, as previously described. In addition, for example, again, as a non-limiting illustration, a digital filter operation, such as a Hanning window, may be employed. Employing a transform, such as a DFT, in which a Hanning window is used for F signal measurements in a sub-range, may yield F complex-valued amplitudes at 3 pixel locations. Accordingly, S×J transforms may be performed in block 22 yielding S×J×F amplitudes designated $A_{sjf}$, where s comprises a sub-window number, j comprises a pixel number, and f comprises an index, e.g., f=1, 2, 3 . . . F.

It is noted that since signal measurements or signal sample values may be in a time domain or in a frequency domain, and a one-to-one mapping between signal measurements exists, f comprises an index applicable to either domain. For example, in this description, a convention is used for a transform, such as a DFT, such that f=1 corresponds to a so-called "DC component," referring to zero frequency, and f=F/2 corresponds to a so-called "Nyquist frequency." Thus, there may be two distinct amplitudes such that amplitude at index f (which here may correspond to a frequency value in a frequency domain) comprises a complex conjugate of amplitude at index F−f+2 (which here may also correspond to a frequency value in a frequency domain) for real-valued optical signal intensity values measured at a detector. In one particular example implementation, as a simple illustration, values for S and F may comprise 28 and 512, respectively. An optical source may emit optical signals from about 1000 nm to about 1070 mm. Therefore, for this example, as was described, sub-ranges may be employed to produce an overlap of approximately 6 nm between immediately neighboring 8 nm wide sub-ranges, for example, though claimed subject matter is, of course, not so limited.

Amplitudes $A_{sjf}$ obtained from a transform, such as a DFT, of signal measurements (e.g., signal sample values) may be used to compute MPI density coefficients at block 22. For example, S×J×F amplitudes $A_{sjf}$, as described below, may be used to estimate S×F MPI density coefficients, $C_{sf}$. An estimate energy distribution may then, for example, be computed or plotted, as discussed with reference to block 24.

For example, continuing with an illustration of an embodiment, relative power associated with a dominant mode in sub-window s may be estimated as DC power $P_{sDC}$ given by $$P_{sDC} = \Sigma_j |A_{sjDC}| \tag{1}$$

where, in an embodiment, $A_{sjDC}$ may be computed substantially according to $$A_{sjDC} = \sqrt{|A_{sj1}|^2 + 2\Sigma_{i=2}^N |A_{sjf}|^2} \tag{2}$$

where $A_{sj1}$ may comprise amplitude of a DC component at a pixel j of a signal sample value in a sub-window s, by convention, as described above. $A_{sj2}$ may comprise amplitude of an immediately next frequency component, by index designation, at pixel number j, and so on. Relation (2) above includes amplitudes for index numbers corresponding to frequencies above a zero frequency component in connection with estimating amplitude of a DC component. Typically, this may be the case since signal measurements (e.g., signal sample values) may include some measurement imperfections, although this is merely an embodiment and claimed subject matter is not limited in scope in this respect.

Thus, in one implementation, imperfections from a variety of sources may be at least partially accounted for to estimate power of a DC component using a relation, such as (2), provided above. For example, a slowly varying signal envelope, which may affect measurements, may be due at least in part, for example, to variations in responsiveness of a detector or variations in intensity of an optical source. Likewise, as another example, a slowly varying signal envelope may be due, at least in part, to employing a windowing operation and thereby affect signal measurements. In these and other implementations, it may therefore be beneficial to include amplitudes $A_{sj2}, A_{sj3}, \ldots A_{SjN}$, as indicated in relation (2), referred to by index number, where i may be 2 to 10, for example in relation (2). N may be chosen to at least partially account for a variety of potential measurement imperfections, such as those previously described, for example. If, however, an observed impact of imperfections affecting signal measurements is relatively small, as may be the case for some embodiments, for example, $A_{sj2}, A_{sj3}, \ldots A_{sjN}$ may be relatively small and may, therefore, be ignored if desired so that $A_{sjDC}$ may be estimate using $A_{sj1}$, in an embodiment, if desired.

Relative optical power $P_{sf}$ associated with an index number f in sub-window s may be expressed as $$P_{sf} = \sum_j \frac{|A_{sjf}|^2}{|A_{sjDC}|} \tag{3}$$

Here, we assume amplitudes used to estimate a DC component $A_{sjDC}$, as just described, for an embodiment, where f indexes intermodal group delay in the time domain.

If $P_{sDC}$ is much larger than individual $P_{sf}$, then an MPI density coefficient $C_{sf}$ may be computed to be $$C_{sf} = \frac{P_{sf}}{P_{sDC}} \tag{4}$$

and there may be in this example a total of S×F distinct MPI density components, one for a corresponding sub-window s and index f, for example. Individual components $C_{sf}$ may be valued between 0 and 1 and, therefore, estimate an approximate fraction of optical power present at an intermodal indexed group delay (e.g., f) relative to a dominant mode for a sub-window s, for example. Accuracy of MPI density coefficient $C_{sf}$ may be relatively high if $P_{sDC}$ is substantially larger than the sum of the $P_{sf}$.

MPI density coefficients, as calculated above, estimate relative power within a sub-range of a particular intermodal group delay indexed by f. At this point, a method embodiment may continue to block 24. For example, having computed MPI, MPI values may be used to estimate energy distribution through a plot or further computation; however, alternately or in addition, MN values, or a trajectory of features in the two-dimensional spectrogram, may be employed elsewhere for some other purpose (e.g., to estimate intermodal dispersion), or, as still another alternative, an embodiment may cease, for example.

However, if continuing to block 24, at block 24, a set of S×F distinct MPI density components $C_{sf}$ may be arranged into an MPI density spectrogram, which may, for example, comprise a representation of an estimate of distribution of optical energy for a FUT. An MPI density spectrogram may comprise a two-dimensional plot in which intermodal group delay may be, for example, along a first axis and S distinct sub-windows may be along another axis substantially orthogonal to the first axis, and a magnitude of local $C_{sf}$ may be denoted, for example, using brightness intensity. As suggested, other types of plots and signal processing results may likewise be produced from MPI density coefficients.

In one example, magnitudes of individual $C_{sf}$ may be presented in a conventional linear scale or alternatively in a logarithmic scale with units of decibels (dB), for example. Intermodal group delay d may be calculated and plotted by employing scaling in conjunction with index f, to appropriately adjust for use of sub-ranges, as follows $$d = \frac{f}{F\Delta v} \quad (5)$$

where $\Delta v$ comprises sampling frequency interval.

Regions of interest may be identified, such as for an MPI density spectrogram or similar plot. Examples of regions of interest, as described in more detail below, may include 'streaks' of elevated $C_{sf}$ traversing a spectrogram or may include 'diffuse regions' of elevated $C_{sf}$ (corresponding to distributed scattering events). Alternately or in addition, in an embodiment, coefficients $C_{sf}$ associated with a region of interest may be summed. For example, in an embodiment, $MPI_s$ for that region may be computed substantially in accordance with relation (6), as provided below and later described. Likewise, other types of processing of coefficients may be employed to bring out other features of interest. Therefore, details of process embodiment 200 are merely examples, and claimed subject matter is not so limited.

FIG. 3 includes a one-dimensional plot 310 of an FUT, previously mentioned, a corresponding two-dimensional spectrogram 320 according to an embodiment, and a corresponding two-dimensional spectrogram 330 produced by simulation. Here, the FUT comprises a loosely coiled 20 meter long segment of 125 micron diameter large-mode-area optical cladding material including a 20 micron diameter fiber core having a 0.08 numerical aperture (NA). In this example, a single-mode fiber is fusion spliced to an input face of the FUT. A mismatch between an approximately 7 micron diameter launching mode field of the single-mode fiber and an approximately 15 micron diameter fundamental mode field of the FUT may potentially produce a coupling of energy, here into $LP_{02}$ HOM. Generally, a mode of an optical fiber is represented as '$LP_{mn}$,' where LP stands for linearly polarized mode, m represents half number of variations along an azimuthal direction, and n represents number of variations along a radial direction. A small 20 gram weight draped over a location a few centimeters downstream of the fusion splice previously mentioned may likewise produce coupling, here between a fundamental $LP_{01}$ mode and a $LP_{11}$ HOM.

A one-dimensional plot, such as 310, of amplitude versus intermodal group delay may be obtained by providing optical signals from a tunable laser source to the FUT via a launching pigtail, e.g., the fused single mode fiber mentioned above. Optical signals emitted from an output face of the FUT may be collected via collection optics, as previously mentioned. For example, here, a lens may direct photons to a silicon charge coupled device (CCD) detector, for example. Signal measurements (e.g., signal sample values) based, at least in part, on electronic signals responsive to optical signals impinging on a detector, such as a CCD detector, here, may be captured and stored as a tunable laser source provides emissions across a range of wavelengths, here approximately 1000 nm to approximately 1070 nm.

As previously described, signal measurements may be processed in a manner to yield a spectrum, such as 310, such as by employing a transform across a relevant range of wavelengths (or frequencies) in this example, approximately 1000 nm to approximately 1070 nm, e.g., for example. Amplitudes calculated for particular intermodal group delay may be summed over pixel locations, as previously described. The abscissa of a plot, such as 310, may comprise intermodal group delay and the ordinate may comprise a sum of amplitudes over appropriate pixels. The x-axis may be considered as related to an amount of intermodal group delay per-unit-length of FUT (e.g., group velocity differences). Amplitude along the y-axis may be considered to be related to a relative amount of optical energy.

Peaks 311, 312, or 313 represent spurious reflections previously known to be present in the response of the experimental apparatus and, therefore, do not relate to modal content. However, sharp peak 315 or broadened features 314 and 316 may comprise examples of energy exchanged, as previously described, such as, between a dominant mode and another mode, likely HOMs, for example. It is assumed a dominant mode comprises a fundamental mode. Sharp peak 315, for example, appears to correspond to discrete scattering between a fundamental mode and a HOM mode. Likewise, broadening of features 314 and 316, from appearances, might suggest distributed scattering between a fundamental mode and a HOM mode, although, as discussed below, more in-depth analysis, substantially in accordance with an embodiment of claimed subject matter, suggests otherwise.

On the other hand, a multi-dimensional spectrogram, such as two-dimensional spectrogram 320, for example, may be employed to provide additional insight regarding energy exchange among modes as a result of propagation of optical signals, such as for a FUT. As previously described, spectrogram 320 may be generated by a process in which transforms via smaller staggered sub-ranges, as an example, are used. For example, in spectrogram 320, 28 sub-ranges of approximately 8.0 nm width with approximately 6.0 nm overlap for immediately neighboring sub-ranges, as has been previously mentioned, were employed. As was described, MPI density coefficients are calculated substantially in accordance with relation (4). MPI density coefficients are assembled into a grayscale two-dimensional spectrogram 320 in which the ordinate comprises sub-range center wavelength and the abscissa comprises intermodal group delay, in accordance with (5), as indexed by f, as previously discussed. In spectrogram 320, relatively dark shading may indicate a relatively high intensity and relatively light shading may indicate a relatively weak intensity.

In spectrogram 320, discrete peaks 311, 312, 313, and 315 at particular intermodal group delays in spectrum 310 appear as approximately vertical streaks 328, 327, 323, and 326, respectively. Locations of these features in spectrogram 320 do not appear to vary significantly with center wavelengths of sub-windows. However, as illustrated, streak 325 may be substantially inclined with respect to a vertical axis and, therefore, its location may vary with center-wavelengths of sub-windows. Spectrogram 320 shows, for example, that broadened features 314 and 316 in spectrum 310 correspond to a particular trajectory that results, at least in part, from discrete scattering into a mode that physically realizes dispersion over the wavelength range of the measurement. In particular, streaks 321 and 322 in spectrogram 320 may be identified as beating between the $LP_{11}$ and $LP_{02}$ modes based, at least in part, on intensity and phase images, discussed in more detail infra. Streaks 321 and 322, therefore, appear to comprise a manifestation of a single trajectory corresponding to an absolute magnitude of an intermodal difference between streaks 325 and 326, for example, producing the characteristic illustrated.

Numerically simulated spectrogram 330 may be generated by measuring material refractive indexes for the fiber core and the fiber cladding material, numerically solving for modes and estimating group velocities, for example. Here, intermodal dispersion was calculated based, at least in part, on a modal group effective refractive index that included effects of waveguide dispersion. Streaks 321, 322, 324, 325, and 326 in the measured spectrogram are reasonably well predicted by features 331, 332, 334, and 333 in the numerical spectrum. Of course, such details of spectrograms 320 and 330 are merely examples, and claimed subject matter is not so limited. In an embodiment, however, a similar approach may be used to better understand intermodal properties for a waveguide, such as to estimate energy distribution and/or estimate modal dispersion, for example.

Figure 8:
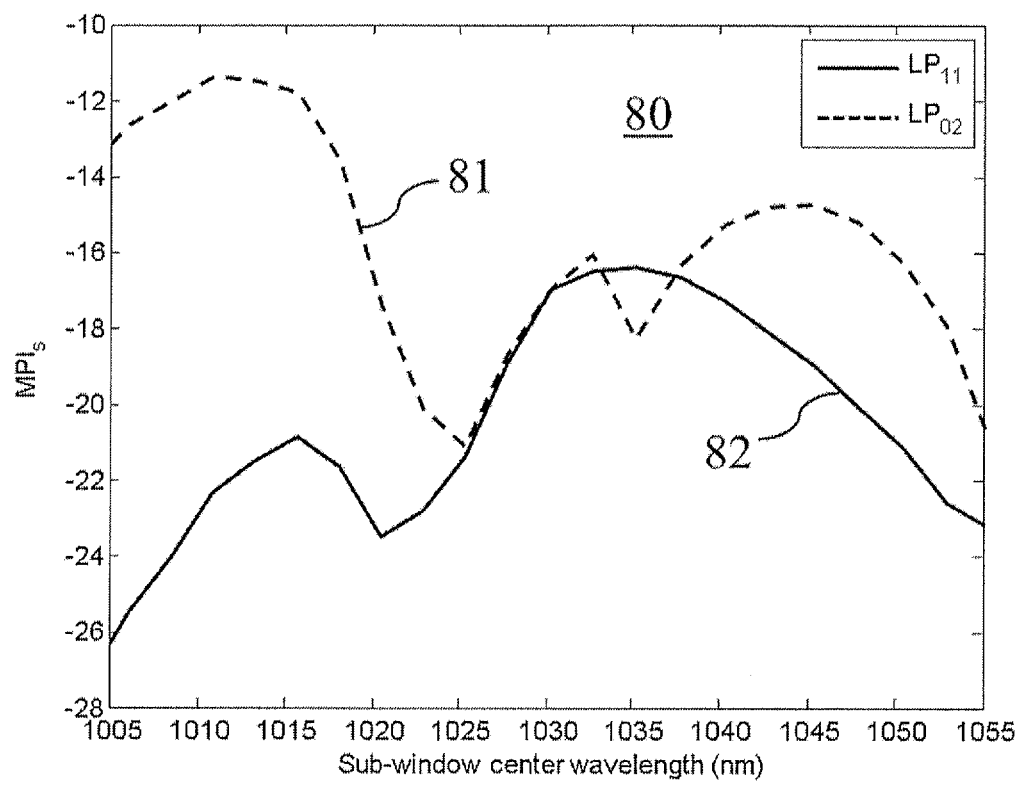
FIG. 8 is a plot illustrating an embodiment quantifying variation of MPI with center frequency of sub-windows.

MPI may be understood to describe power contained in a particular propagating mode relative to power contained in another (e.g., a dominant) mode, which may comprise a fundamental mode. MPI by construction (e.g., relation (4)) comprises a ratio between a dominant propagating mode and a weaker propagating mode. FIG. 8 is a plot 80 of characteristics showing an embodiment of variation of MPI with center wavelength of a sub-window. Further, curves shown in 80 were generated based, at least in part, on CV coefficients used to generate spectrogram 320. Curves 81 and 82, therefore, show variation of MPI, with sub-window center wavelength for $LP_{02}$ and $LP_{11}$ modes, respectively. Plots, such as 80, therefore, comprise an example of an embodiment of a wavelength-sensitive characterization of a distribution of energy among modes.

Note that curves in 80 illustrate the two modes as overlapping around wavelength 1027 nm. Likewise, returning to FIG. 3, streaks 326 and 324 intersect in spectrogram 320 at an intermodal group delay of approximately 23.0 picoseconds (ps) and a center wavelength of approximately 1027 nm. However, in general, this may be an undesirable situation since features of both modes occupy a corresponding portion of a spectrum for a particular center wavelength. Instead, it may be beneficial to select a spectrum with a center wavelength of 1010 nm or 1050 nm since streaks in a spectrogram would be separate for these center wavelengths from the appearance of FIG. 3 and FIG. 8. Thus, for an embodiment, signal processing may be performed in a manner to potentially improve estimation accuracy of MPI. For example, MPI may be calculated for the two modes using sub-ranges (e.g., at center wavelengths of 1010 or 1050 mm, respectively) so that features evident in a spectrogram do not overlap.

A streak in a spectrogram may be substantially parallel to a vertical if, for example, intermodal dispersion of the mode is relatively small. On the other hand, a streak may be oriented at an angle with respect to a vertical if, for example, discrete scattering of energy takes place to a guided mode having relatively large intermodal dispersion. This may produce a streak that traverses a two-dimensional spectrogram at an incline, such as illustrated by 320, for example. Therefore, another intermodal property of a waveguide, intermodal dispersion, such as for a FUT, may be estimated using an embodiment in accordance with claimed subject matter. For example, in an embodiment, a perturbation may be introduced so as to generate discrete scattering. This may potentially identify modes having relatively large intermodal dispersion if, for example, discrete scattering results in energy transfer to such modes. A multi-dimensional spectrogram may be employed, therefore, to reveal and estimate such intermodal dispersion. For example, intermodal dispersion between a dominant mode and another excited mode may be quantified as a derivative of intermodal group delay with respect to wavelength (or equivalently, frequency). Therefore, an estimate of slope of an inclined steak, as illustrated in 320, for example, may be used to estimate dispersion.

If a modal feature identified in a multi-dimensional spectrogram is of particular interest, intermodal properties may potentially be better understood substantially in accordance with relations (7) and (8) below. In particular, electromagnetic field intensity and phase diagrams may be generated. A modal identity of a streak or feature in a spectrogram, for example, may be better ascertained by constructing intensity and phase electromagnetic field diagrams from $A_{sjf}$. For example, in an embodiment, an interfering mode may potentially be identified from calculating a spatial distribution of phase and intensity for an associated electromagnetic field.

An expression for spatial distribution of intensity for an associated electromagnetic field may be calculated substantially in accord with:

$$M_{sf}(j) = \frac{|A_{sjf}|^2}{|A_{sjDC}|} \qquad (7)$$

where $M_{sf}(j)$ comprises a local optical intensity of an interfering mode electromagnetic field as a function of pixel number j, $A_{sjf}$ comprises a complex amplitude with respect to sub-window s for pixel j at f, and $A_{sjDC}$ may be computed substantially in accordance with relation (2). Likewise, if a dominant mode comprises a fundamental mode, a spatial distribution of a phase of an associated electromagnetic field may be given by a spatial distribution of phase of $A_{sjf}$, $\phi_{sf}(j)$, substantially in accordance with:

$$\phi_{sf}(j) = \angle A_{sjf} \qquad (8)$$

where $\angle A_{sjf}$ comprises a complex phase angle of $A_{sjf}$. Such an approach identifies streak 326 as interference between the fundamental mode and the $LP_{11}$ HOM mode and identifies streak 325 as interference between the fundamental mode and the $LP_{02}$ HOM mode, for example.

Figure 4:
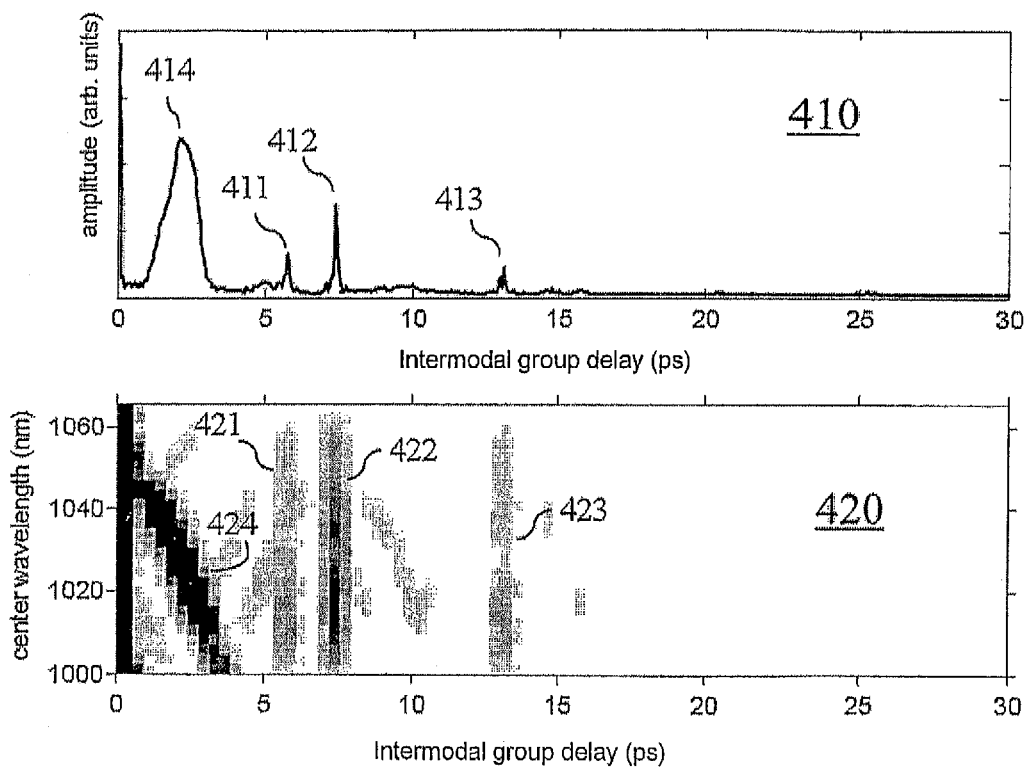
FIG. 4 are plots respectively illustrating a one-dimensional chart and a corresponding two-dimensional spectrogram illustrating a multi-dimensional spectrogram embodiment.

FIG. 4 compares a one-dimensional spectrum 410 to a spectrogram 420 generated using techniques described above, for example. Both representations may be generated based, at least in part, on a FUT comprising a standard single-mode telecom fiber, where the single mode wavelength comprises 1550 nm. In one-dimensional spectrum 410, peaks 411, 412, or 413 again correspond to known reflections in the measurement apparatus. Broadened feature 414 in spectrum 410 conventionally would indicate distributed scattering along the length of the FUT. However, feature 414 may instead correspond to discrete scattering. Spectrogram 420 demonstrates, for example, that broadened feature 414 from chart 410 may be associated with a discrete streak 424 that exhibits a wavelength-dependent intermodal group delay, as previously described. With the aid of spectrogram 420, for example, streak 424 may be attributed to a discrete scattering event rather than a distributed scattering event. Streaks 421, 422, and 423 in spectrogram 420 may be associated with spurious reflection peaks 411, 412, and 413, respectively, in spectrum 410, as described.

Figure 5:
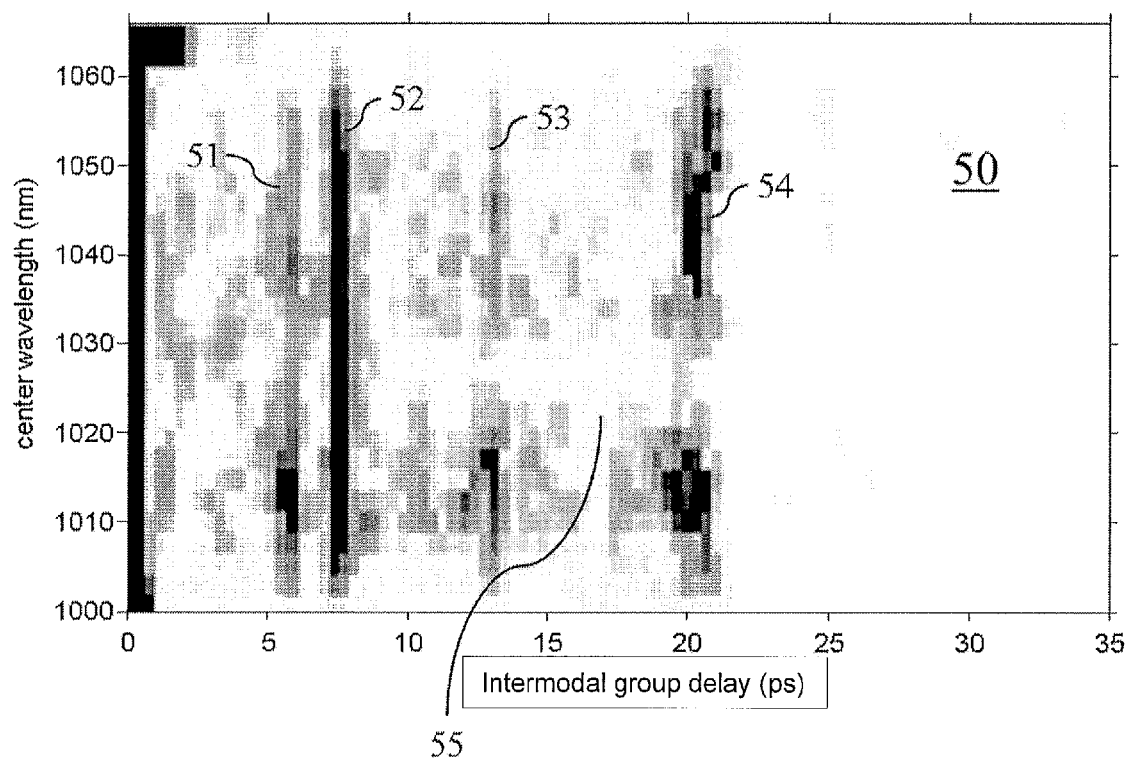
FIG. 5 is a plot of a two-dimensional spectrogram illustrating a multi-dimensional spectrogram embodiment.

FIG. 5 shows a two dimensional spectrogram 50 for a fiber exhibiting distributed scattering, according to an embodiment. Distributed scattering may manifest itself as regions of diffuse amplitudes, such as in region 55 to the left of streak 54, for example. Similar to the case described above for spectrogram 420, streaks 51, 52, and 53 may be associated with previously known spurious reflections in the measurement apparatus. Distributed scattering may be manifested by a region containing a diffuse set of elevated amplitudes, as illustrated by spectrogram 50, such that the amplitudes are shown to be substantially independent of intermodal group delay or of wavelength, for example. Of course, such details of spectrograms 420 and 50 are merely examples, and claimed subject matter is not so limited.

Figure 9:
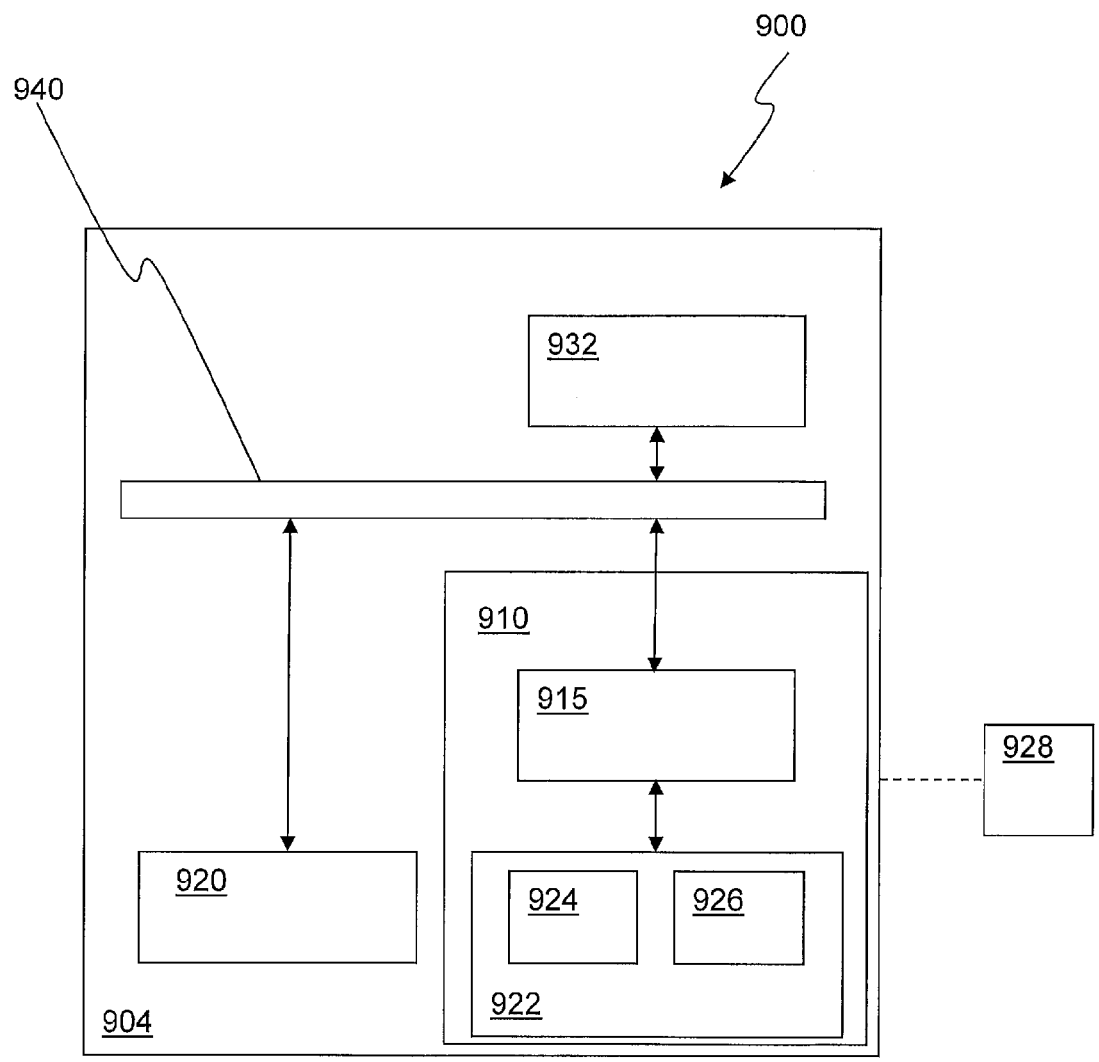
FIG. 9 is a schematic diagram illustrating an embodiment of a computing system.

FIG. 9 is a schematic diagram illustrating an embodiment of a computing system 900 including a memory device 910. A computing device may comprise one or more processors, for example, to execute an application or other code. A computing device 904 may be representative of any device, appliance, or machine, for example, to manage memory device 910. Memory device 910 may likewise include a memory controller 915 and a memory 922. By way of example but not limitation, computing device 904 may include or represent: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or information storage service provider/system; or any combination thereof.

It is recognized that all or part of various devices, as shown in system 900, and processes and/or methods, as described herein, for example, may be implemented using or otherwise including hardware, firmware, software, or any combination thereof. Thus, by way of example but not limitation, computing device 904 may include at least one processing unit (e.g., processor) 920 that is operatively coupled to memory 922 via a bus 940 and a host or memory controller 915, as an example.

Processing unit 920 may be representative of one or more circuits, as an example, to perform a computing procedure or process, such as process 200, for example. Also, processing unit 920 may be representative of one or more circuits, for example, to transform electronic signals, as previously described. By way of example but not limitation, processing unit 920 may include one or more processors, controllers, microprocessors, microcontrollers, application specific integrated circuits, digital signal processors, programmable logic devices, field programmable gate arrays, and the like, or any combination thereof. Processing unit 920 may include an operating system to communicate with memory controller 915. Such an operating system may, for example, generate commands to be sent to memory controller 915 via bus 940. Such commands may comprise read or write commands. Of course, such details of a portion of memory are merely examples, and claimed subject matter is not so limited.

In one embodiment, processing unit 920 may receive measurements from an optical detector of optical power of an optical signal at a plurality of wavelengths and at a plurality of locations on the optical detector. Processing unit 920 may convert the measured optical power from an optical frequency domain to a time domain by performing a Fourier transform, for example. In another embodiment, processing unit 920 may execute computer implementable instructions stored in a non-transitory computer readable medium to: receive measurements of optical power of an optical signal at a plurality of wavelengths and for a plurality of locations on a spatially-resolved optical detector for an optical signal emitted from a waveguide or waveguide device; and convert the measurements of optical power from an optical frequency domain to a time domain by performing a Fourier transform for the individual locations using sub-windows of a range of wavelengths of the optical signal.

Memory 922 is representative of any information storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory or one or more information storage devices or systems, such as, for example, a disk drive, an optical disc drive, a tape drive, a solid state memory drive, etc. In certain implementations, secondary memory 926 may be operatively receptive of, or otherwise capable of being coupled to a computer-readable medium 928, for example. Computer-readable medium 928 may include, for example, any medium that can store or make accessible signals, such as representing information, code, or instructions, for one or more of the devices in system 900. Computing device 904 may include, for example, an input/output device 932. Input/output device 932 is representative of one or more devices or features to accept or otherwise introduce human or machine generated input signals, or one or more devices or features to deliver or otherwise provide for human or machine generated output signals. By way of example but not limitation, input/output device 932 may include an operatively configured display, speaker, keyboard, mouse, trackball, touch screen, etc.

Reference throughout this disclosure to "one embodiment" or "an embodiment" means that a particular feature, structure, or characteristic described in connection with an embodiment is included in at least one embodiment of claimed subject matter. Appearances of the phrase "in one embodiment" or "an embodiment" in various places throughout this disclosure are not necessarily all referring to the same embodiment. Furthermore, particular features, structures, or characteristics may be combined in one or more embodiments.

Likewise, in this context, the terms "coupled" or "connected," or similar terms, may be used. It should be understood that these terms are not intended as synonyms. Rather, "connected" may be used to indicate that two or more elements or other components, for example, are in direct physical or electrical contact; while, "coupled" may mean that two or more elements are in direct physical or electrical contact, "coupled" may also mean that two or more elements are not in direct contact, but may nonetheless co-operate or interact. The term coupled may also be understood to mean indirectly connected, for example, in an appropriate context.

The terms, "and" and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense.

Some portions of the preceding detailed description have been presented in terms of logic, algorithms and/or symbolic representations of operations on binary signals or states stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software. Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result.

In this context, operations and/or processing involve physical manipulation of physical quantities, such as measurements. Typically, although not necessarily, such quantities may take the form of electrical and/or magnetic signals and/or states capable of being stored, transferred, combined, compared or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels.

Unless specifically stated otherwise, as apparent from the preceding discussion, it is appreciated that throughout this disclosure discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

It will, of course, be understood that, although particular embodiments have just been described, claimed subject matter is not limited in scope to a particular embodiment or implementation. For example, one embodiment may be in hardware, such as implemented on a device or combination of devices, for example. Likewise, although claimed subject matter is not limited in scope in this respect, one embodiment may comprise one or more articles, such as a storage medium or storage media that may have stored thereon instructions capable of being executed by a specific or special purpose system or apparatus, for example, to result in performance of an embodiment of a method in accordance with claimed subject matter, such as one of the embodiments previously described, for example. However, claimed subject matter is, of course, not limited to one of the embodiments described necessarily. Furthermore, a specific or special purpose computing platform may include one or more processing units or processors, one or more input/output devices, such as a display, a keyboard or a mouse, or one or more memories, such as static random access memory, dynamic random access memory, flash memory, or a hard drive, although, again, claimed subject matter is not limited in scope to this example.

In the preceding description, various aspects of claimed subject matter have been described. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter. While certain features have been illustrated or described herein, many modifications, substitutions, changes, or equivalents may now occur to those skilled in the art. It is, therefore, to be understood that the appended claims are intended to cover all such modifications or changes as fall within the true spirit of claimed subject matter.

The invention claimed is:

1. A method to estimate energy distribution and/or energy transfer across various modes for a waveguide using a system comprising at least: an apparatus to emit electromagnetic radiation across a range of frequencies, collection optics, an electromagnetic radiation sensor, and a computing system, said method comprising:

estimating electromagnetic energy distribution via the system with respect to the modes of the waveguide using a multi-dimensional spectrogram rather than a one dimensional spectrum to resolve separate intermodal group delays at least for a particular sub-range of frequencies if separate intermodal group delays are not resolvable at a different sub-range of frequencies for a plurality of waveguide output locations;

wherein the estimating further comprises:

transmitting electromagnetic signals via a transverse mode through the waveguide at least across a range of frequencies that includes the particular sub-range;

collecting the electromagnetic signal measurements at the waveguide output locations;

processing the collected electromagnetic signal measurements so as to compute a multi-dimensional spectrogram across the range of frequencies that includes the particular sub-range; and wherein the computed multi-dimensional spectrogram provides an estimate of intermodal group delay for the waveguide versus frequency across the range of frequencies.

2. The method of claim 1, wherein the range comprises two or more limited sub-ranges.

3. The method of claim 1, wherein the estimation takes place in the time domain.

4. The method of claim 1, wherein the estimation takes place in the frequency domain.

5. The method of claim 1, and further comprising: converting measurements to an alternate domain either before or after estimation by applying one or more transforms.

6. The method of claim 5, wherein the one or more transforms comprise one or more Fourier transforms.

7. The method of claim 1, wherein the estimating including performing digital signal processing of electromagnetic signal measurements by employing one or more DFTs.

8. The method of claim 7, wherein the estimating, after said one or more DFTs, comprises computing MPI density coefficients.

9. A system to estimate energy distribution and/or energy transfer across various modes for a waveguide, the system comprising at least: an apparatus to emit electromagnetic radiation across a range of frequencies, collection optics, an electromagnetic radiation sensor, and a computing system;
the system to estimate electromagnetic energy distribution with respect to the modes of the waveguide using a multi-dimensional spectrogram to resolve separate intermodal group delays at least for a particular sub-range of frequencies if separate intermodal group delays are not resolvable at a different sub-range of frequencies for a plurality of waveguide output locations; wherein the apparatus to emit electromagnetic radiation across a range of frequencies comprises a tunable laser;
wherein the electromagnetic radiation sensor comprises a sensor array; and
wherein the computing system includes a processor and memory with executable instructions;
the computing system to collect electromagnetic signal measurements at the waveguide output locations via the sensor array and to process the electromagnetic signal measurements so as to compute a multi-dimensional spectrogram across the range of frequencies that is to include the particular sub-range; and
wherein the multi-dimensional spectrogram is to provide an estimate of intermodal group delay for the waveguide versus frequency across the range of frequencies.

10. The system of claim 9, wherein the computing system to further employ one or more DFTs to transform the electromagnetic signal measurements.

11. The system of claim 10, wherein the computing system to further compute MPI density coefficients after the one or more DFTs.

12. An article comprising: a non-transitory storage medium having stored thereon instructions executable by a computing system, the computing system to be included in a system to estimate energy distribution and/or energy transfer across various modes for a waveguide, the system further to comprise, in addition to the computing system, at least: an apparatus to emit electromagnetic radiation across a range of frequencies, collection optics, and an electromagnetic radiation sensor;
the system further to estimate electromagnetic energy distribution with respect to the modes of the waveguide using a multi-dimensional spectrogram to resolve separate intermodal group delays at least for a particular sub-range of frequencies if separate intermodal group delays are not resolvable at a different sub-range of frequencies for a plurality of waveguide output locations; wherein the apparatus to emit electromagnetic radiation across a range of frequencies comprises a tunable laser;
wherein the electromagnetic radiation sensor to comprise a sensor array; and
wherein the instructions being executable to collect electromagnetic signal measurements at the waveguide output locations via the sensor array and to process the electromagnetic signal measurements so as to compute a multi-dimensional spectrogram across the range of frequencies that is to include the particular sub-range; and
wherein the multi-dimensional spectrogram is to provide an estimate of intermodal group delay for the waveguide versus frequency across the range of frequencies.

13. The article of claim 12, wherein the storage medium having stored thereon instructions further to employ one or more DFTs to transform the electromagnetic signal measurements.

14. The article of claim 13, wherein the storage medium having stored thereon instructions further to compute MPI density coefficients after the one or more DFTs.

15. A system to estimate energy distribution and/or energy transfer across various modes for a waveguide, the system comprising at least: an apparatus to emit electromagnetic radiation across a range of frequencies, collection optics, an electromagnetic radiation sensor, and a computing system;
the system to further estimate electromagnetic energy distribution with respect to the modes of the waveguide using a multi-dimensional spectrogram to resolve separate intermodal group delays at least for a particular sub-range of frequencies if separate intermodal group delays are not resolvable at a different sub-range of frequencies for a plurality of waveguide output locations;
wherein the apparatus to emit electromagnetic radiation across a range of frequencies comprises a broadband electromagnetic radiation source;
wherein the electromagnetic radiation sensor comprises a sensor array; and
wherein the computing system includes a processor and memory with executable instructions;
the computing system further to collect electromagnetic signal measurements at the waveguide output locations via the sensor array and to process the electromagnetic signal measurements so as to compute a multi-dimensional spectrogram across the range of frequencies that is to include the particular sub-range; and
wherein the multi-dimensional spectrogram is to provide an estimate of intermodal group delay for the waveguide versus frequency across the range of frequencies.

16. The system of claim 15, wherein the computing system to collect electromagnetic signal measurements at the waveguide output locations via the sensor array to further filter the electromagnetic signal measurements at the waveguide output locations so as to discriminate electromagnetic frequency.

17. The system of claim 15, wherein the range of frequencies to comprise two or more limited sub-ranges.

18. The system of claim 15, wherein the computing system further to process the electromagnetic signal measurements in the time domain.

19. The system of claim 15, wherein the computing system further to process the electromagnetic signal measurements in the frequency domain.

20. The system of claim 15, wherein the computing system further to convert the electromagnetic signal measurements to an alternate domain.

21. The system of claim 20, wherein the computing system further to convert the electromagnetic signal measurements to an alternate domain via one or more transforms.

22. The system of claim 21, wherein the computing system further to convert the electromagnetic signal measurements to an alternate domain via one or more Fourier transforms.

23. The system of claim 15, wherein the computing system further to perform digital signal processing via computation of one or more DFTs.

24. The system of claim 23, wherein the computing system further to compute MPI density coefficients to estimate energy distribution and/or energy transfer across the various modes for the waveguide.

25. An article comprising: a non-transitory storage medium having stored thereon instructions executable by a computing system, the computing system to be included in a system to estimate energy distribution and/or energy transfer across various modes for a waveguide, the system further to comprise, in addition to the computing system, at least: an apparatus to emit electromagnetic radiation across a range of frequencies, collection optics, and an electromagnetic radiation sensor;

the system further to estimate electromagnetic energy distribution with respect to the modes of the waveguide using a multi-dimensional spectrogram to resolve separate intermodal group delays at least for a particular sub-range of frequencies if separate intermodal group delays are not resolvable at a different sub-range of frequencies for a plurality of waveguide output locations;

wherein the apparatus to emit electromagnetic radiation across a range of frequencies to comprise a broadband electromagnetic radiation source;

wherein the electromagnetic radiation sensor to comprise a sensor array; and wherein the instructions being executable to collect electromagnetic signal measurements at the waveguide output locations via the sensor array and to process the electromagnetic signal measurements so as to compute a multi-dimensional spectrogram across the range of frequencies that is to include the particular sub-range; and wherein the multi-dimensional spectrogram is to provide an estimate of intermodal group delay for the waveguide versus frequency across the range of frequencies.

26. The article of claim 25, wherein the instructions are further executable to filter the electromagnetic signal measurements at the waveguide output locations so as to discriminate electromagnetic frequency.

27. The article of claim 25, wherein the instructions are further executable to process the electromagnetic signal measurements in the time domain.

28. The article of claim 25, wherein the instructions are further executable to process the electromagnetic signal measurements in the frequency domain.

29. The article of claim 25, wherein the instructions are further executable to convert the electromagnetic signal measurements to an alternate domain.

30. The article of claim 29, wherein the instructions are further executable to convert the electromagnetic signal measurements to an alternate domain via one or more transforms.

31. The article of claim 30, wherein the instructions are further executable to convert the electromagnetic signal measurements to an alternate domain via one or more Fourier transforms.

32. The article of claim 25, wherein the instructions are further executable to perform digital signal processing via computation of one or more DFTs.

33. The article of claim 32, wherein the instructions are further executable to compute MPI density coefficients to estimate energy distribution and/or energy transfer across the various modes for the waveguide.

* * * * *